US012759809B2

(12) United States Patent
Park et al.

(10) Patent No.: US 12,759,809 B2
(45) Date of Patent: Oct. 13, 2026

(54) DEVICE AND METHOD FOR TRANSPORTING ARTICLES

(71) Applicant: SEMES CO., LTD., Chungcheongnam-do (KR)

(72) Inventors: Kyu Hyung Park, Gyeonggi-do (KR); Eun Ji Choi, Gyeonggi-do (KR); Jun Beom Lee, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 76 days.

(21) Appl. No.: 18/972,641

(22) Filed: Dec. 6, 2024

(65) Prior Publication Data

US 2025/0187852 A1 Jun. 12, 2025

(30) Foreign Application Priority Data

Dec. 7, 2023 (KR) ........................ 10-2023-0176952

(51) Int. Cl.
*B65G 1/04* (2006.01)
*B65G 35/06* (2006.01)
*B65G 47/90* (2006.01)

(52) U.S. Cl.
CPC ........... *B65G 47/901* (2013.01); *B65G 35/06* (2013.01); *B65G 2203/0233* (2013.01); *B65G 2203/0283* (2013.01)

(58) Field of Classification Search
None
See application file for complete search history.

(56) References Cited

U.S. PATENT DOCUMENTS

| | | | | |
|---|---|---|---|---|
| 9,685,360 | B2 * | 6/2017 | Kinugawa | H10P 72/3221 |
| 11,084,505 | B2 * | 8/2021 | Kobayashi | B61B 3/02 |
| 2011/0024377 | A1 * | 2/2011 | Yamamoto | H10P 72/3218 212/71 |
| 2015/0197412 | A1 * | 7/2015 | Tomida | B66C 13/18 212/328 |
| 2015/0255318 | A1 * | 9/2015 | Wada | H10P 72/15 212/71 |
| 2017/0323817 | A1 * | 11/2017 | Kobayashi | H10P 72/3221 |
| 2020/0269882 | A1 * | 8/2020 | Kobayashi | B61B 12/00 |

(Continued)

FOREIGN PATENT DOCUMENTS

| | | | | |
|---|---|---|---|---|
| JP | 2018135199 A * | 8/2018 | | B65G 35/06 |
| KR | 10-2022-0079222 | 6/2022 | | |

(Continued)

*Primary Examiner* — Gene O Crawford
*Assistant Examiner* — Muhammad Awais
(74) *Attorney, Agent, or Firm* — WOMBLE BOND DICKINSON (US) LLP

(57) ABSTRACT

An article transport device is provided. The article transport device comprises a housing including an internal space, a driving unit disposed on an upper portion of the housing and traveling along a driving rail installed on a ceiling, a hoist unit disposed in the internal space and gripping a first transport article, and an anti-drop unit installed in the housing and preventing the transport article from falling, wherein the anti-drop unit includes a stroke configured to move toward the internal space, and a contact portion installed at one end of the stroke and contacting the first transport article, wherein the contact portion has a step shape that descends in a direction toward the internal space.

18 Claims, 14 Drawing Sheets

(56) References Cited

U.S. PATENT DOCUMENTS

| | | | | |
|---|---|---|---|---|
| 2022/0258982 A1* | 8/2022 | Tomida | .................. | B65G 17/20 |
| 2022/0402694 A1* | 12/2022 | Kobayashi | ........... | B65G 1/0464 |
| 2023/0140218 A1* | 5/2023 | Kobayashi | ............. | B25J 15/009 |
| | | | | 414/814 |

FOREIGN PATENT DOCUMENTS

| | | | | | |
|---|---|---|---|---|---|
| KR | 10-2022-0088576 | | 6/2022 | | |
| KR | 20220079222 A | * | 6/2022 | ........... | B65G 1/0457 |
| KR | 20220088576 A | * | 6/2022 | ........... | B65G 1/0457 |
| KR | 10-2023-0099606 | | 7/2023 | | |

* cited by examiner

DEVICE AND METHOD FOR TRANSPORTING ARTICLES

CROSS-REFERENCE TO RELATED APPLICATION

This application claims priority from Korean Patent Application No. 10-2023-0176952 filed on Dec. 7, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a device and method for transporting articles.

2. Description of the Related Art

A transport vehicle that runs along a rail installed on the ceiling, such as an overhead hoist transport (OHT), is used to return articles.

A fall prevention member is provided to prevent the articles from falling while the articles are being transported by the transport vehicle.

Aspects and features of embodiments of the present disclosure are to provide an article transport device that may effectively handle articles of various sizes.

Another aspects and features of embodiments of the present disclosure are to provide an article transport device that may effectively handle a large number of articles.

The technical problems of the present disclosure are not limited to the technical problems mentioned above, and other technical problems that are not mentioned may be clearly understood by those skilled in the art from the following description.

SUMMARY

Aspects of the present disclosure provide an article transport device having improved efficiency of handling items of various sizes.

Aspects of the present disclosure also provide a method for handling items of various sizes having improved efficiency.

According to an aspect of the present disclosure, there is provided an article transport device comprising a housing including an internal space, a driving unit disposed on an upper portion of the housing and traveling along a driving rail installed on a ceiling, a hoist unit disposed in the internal space and gripping a first transport article, and an anti-drop unit installed in the housing and preventing the transport article from falling, wherein the anti-drop unit includes a stroke configured to move toward the internal space, and a contact portion installed at one end of the stroke and contacting the first transport article, wherein the contact portion has a step shape that descends in a direction toward the internal space.

According to an aspect of the present disclosure, there is provided a method for transporting articles comprising a housing including an internal space, a driving unit disposed on an upper portion of the housing and traveling along a driving rail installed on a ceiling, a hoist unit disposed in the internal space and gripping a first transported article, and an anti-drop unit disposed in the housing and preventing the first transport article from falling, wherein the anti-drop unit includes a stroke configured to move toward the internal space and a contact portion installed at one end of the stroke and contacting the first transport article, wherein the contact portion has a stair-shaped shape descending in a direction toward the internal space, wherein the hoist unit grips the first transport article and lifts the first transport article into the internal space, wherein the stroke stops when the contact portion contacts the first transport article as the stroke moves toward the internal space.

According to an aspect of the present disclosure, there is provided a method for transporting articles comprising a housing including an internal space, a driving unit disposed on an upper portion of the housing and traveling along a driving rail installed on a ceiling, a hoist unit disposed in the internal space and gripping a first transport article, an anti-drop unit disposed in the housing and including a stroke configured to prevent the first transport article from falling, and moving towards the interior space, and a contact portion installed at one end of the stroke and in contact with the first transport article, a first stroke sensor installed at a portion where the anti-drop unit and the housing are connected and detects whether the stroke has moved to a minimum range of motion and transmits a signal, a second stroke sensor installed at a portion where the anti-drop unit and the housing are connected and detects whether the stroke has moved to a maximum range of motion and transmits a signal, and a control portion that detects signals from the first stroke sensor and the second stroke sensor and stops the stroke, and wherein the contact portion has a stair-shaped shape that descends in a direction toward the internal space.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail illustrative embodiments thereof with reference to the attached drawings, in which.

DETAILED DESCRIPTION

In this specification, although the terms “first,” “second,” and the like are used to describe various elements or components, these elements or components are not limited by these terms. These terms are only used to distinguish one element or component from another element or component. Therefore, the first element or component mentioned below may also be the second element or component within the technical concept of the present disclosure.

Figure 1:
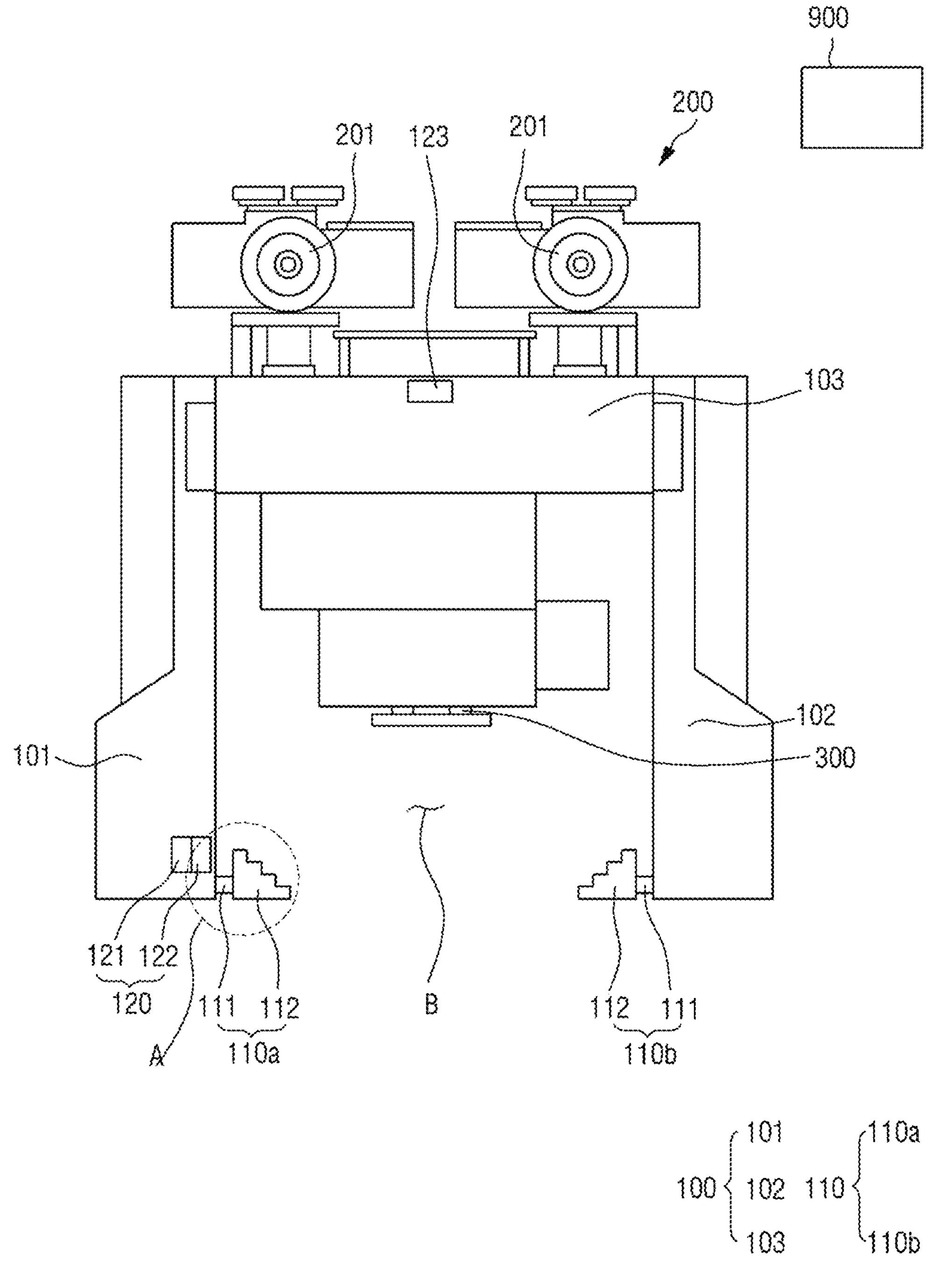
FIG. 1 is a cross-sectional view illustrating an article transport device according to some embodiments of the present disclosure.

FIG. 1 is a cross-sectional view illustrating an article transport device according to some embodiments of the present disclosure.

Referring to FIG. 1, the article transport device may include a housing 100, a driving unit 200, a hoist unit 300, and an anti-drop unit 110.

The housing 100 may surround an outer surface of the article transport device. The housing 100 may include an internal space B. The housing 100 may include a body 103, a first cover 101, and a second cover 102. The first cover 101 may be installed on one side of the body 103 and may protrude downward. The second cover 102 may be installed on the other side of the body 103 and may protrude downward.

A load detection sensor 123 may be disposed in the internal space B. The load detection sensor 123 may detect whether a transport article is located in the internal space B.

The driving unit 200 may be disposed on a top portion of the housing 100. The driving unit 200 may be configured to drive along a driving rail installed on the ceiling. The driving unit 200 may include a plurality of wheels 201. When the article transport device is disposed on the driving rail, the article transport device may be moved by the plurality of wheels 201. Although the case of two wheels is illustrated, this is only for convenience of explanation and is not limited thereto. For example, the driving unit 200 may include three or more wheels.

The hoist unit 300 is disposed in the internal space B of the article transport device may grip the transport article. The hoist unit 300 moves up and down in a vertical direction and may grip and lift or set down a package.

The anti-drop unit 110 may be installed in the housing 100 of the article transport device. The anti-drop unit 110 may include a first anti-drop unit 110*a* and a second anti-drop unit 110*b*. Specifically, the anti-drop unit 110 may include a first anti-drop unit 110*a* installed in the first cover 101 and a second anti-drop unit 110*b* installed in the second cover 102. The anti-drop unit 110 may prevent the transport article from falling. The anti-drop unit 110 may include a stroke 111 and a contact portion 112.

The stroke 111 may be movable toward the interior space B. A contact portion 112 may be installed at one end of the stroke 111. When the stroke 111 starts to move toward the internal space B, it may not stop until the contact portion 112 contacts the return object.

The stroke 111 may move from a position of a minimum range of motion to a position of a maximum range of motion. The position of a minimum range of motion may refer to a time when the stroke 111 is completely inserted into the housing 100.

The stroke sensor 120 may be installed at a location where the anti-drop unit 110 and the housing 100 are connected. The stroke sensor 120 may include a first stroke sensor 121 and a second stroke sensor 122. The first stroke sensor 121 may detect whether the stroke 111 has moved to the minimum operating range and transmit a signal to the control portion 900. The second stroke sensor 122 may detect whether the stroke 111 has moved to the maximum operating range and transmit a signal to the control portion 900.

The control portion 900 may detect signals from the first stroke sensor 121 and the second stroke sensor 122 and stop the stroke 111.

The contact portion 112 may be installed at one end of the stroke 111. When the stroke 111 moves toward the internal space B, the contact portion 112 may contact the transport article. The contact portion 112 may have a step shape that goes down in the direction toward the internal space B. For example, the contact portion 112 may include a step shape having two or more steps.

Figure 2:
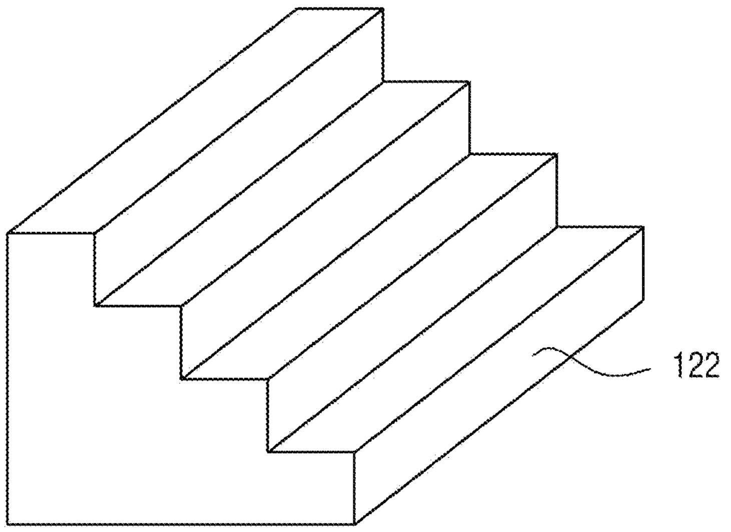
FIG. 2 and FIG. 3 are perspective views of the contact area that enlarges the A area of FIG. 1.
Figure 3:
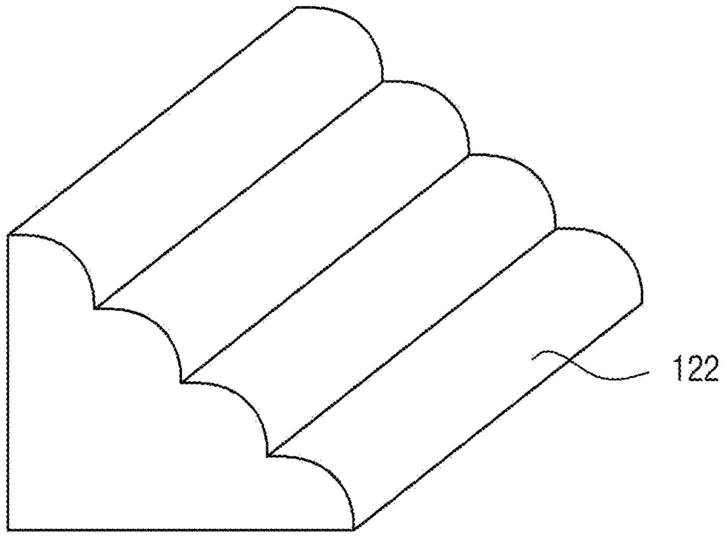

FIG. 2 and FIG. 3 are perspective views of the contact area that enlarges the A area of FIG. 1.

Referring to FIG. 2, the contact portion 112 may include a step shape having two or more steps.

Referring to FIG. 3, the contact portion 112 may include a step shape having two or more steps. The step shape of the contact portion 112 may have a chamfered and curved corner.

Figure 4:
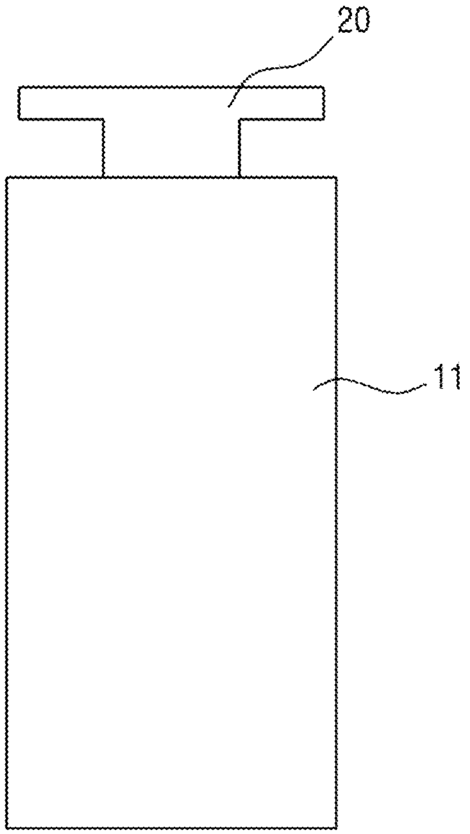
FIG. 4 is a cross-sectional view to illustrate a transport article.

FIG. 4 is a cross-sectional view to illustrate a transport article.

On the upper portion of the transport article 11, a flange portion 20 configured to be gripped by a hoist unit (see 300 in FIG. 1) may be disposed. The flange portion 20 may be detected by a load detection sensor 123 (123 in FIG. 1).

Figure 5:
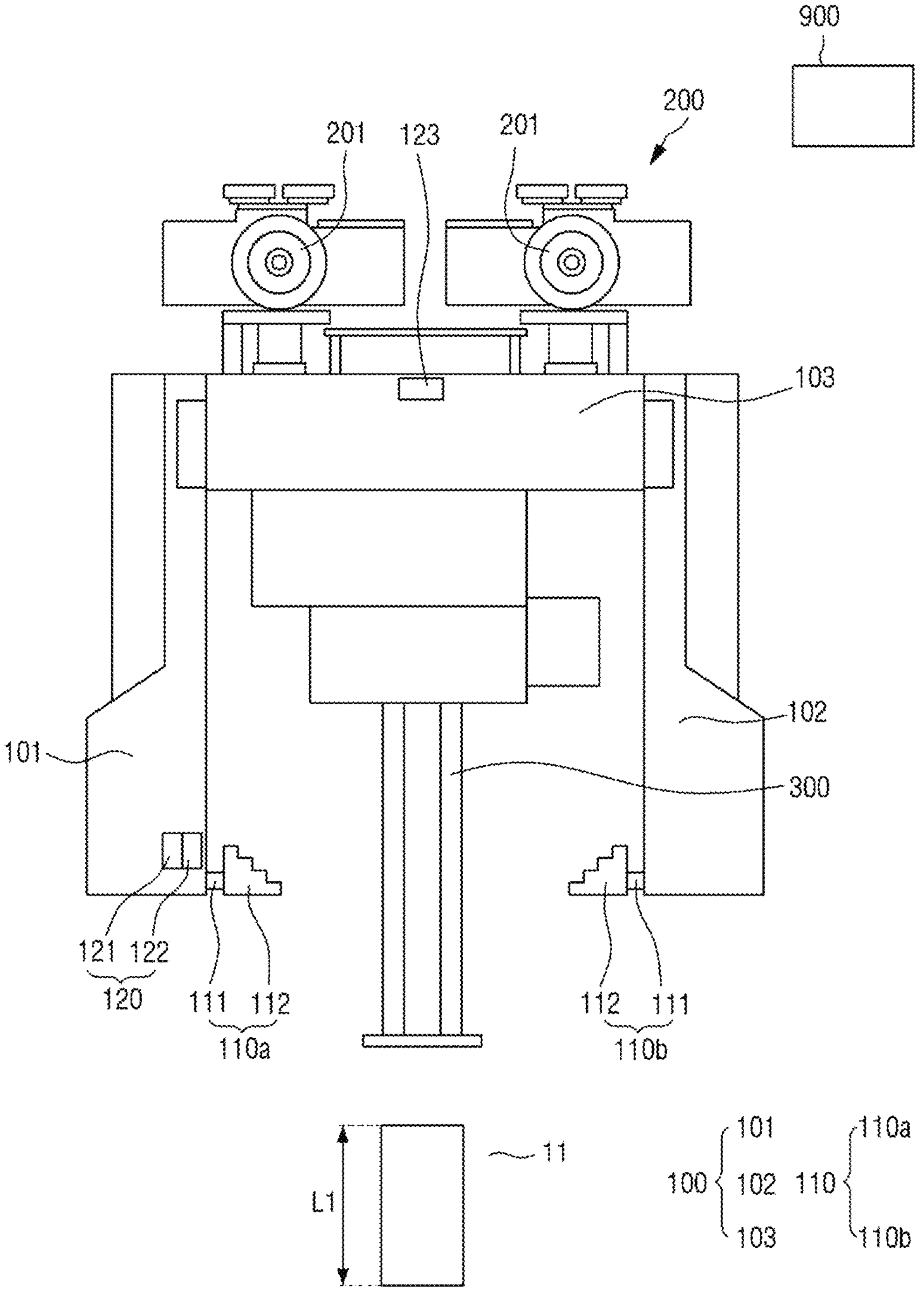
FIG. 5 is a cross-sectional view to illustrate an article transport device according to some embodiments of the present disclosure.

FIG. 5 is a cross-sectional view to illustrate an article transport device according to some embodiments of the present disclosure. For convenience of explanation, FIG. 5 is explained focusing on the differences from the points described in FIG. 1.

Referring to FIG. 5, a first transport article 11 may be disposed at a bottom of the article transport device. The hoist unit 300 may descend toward the first transport article 11 to grip the first transport article 11. Since it is before gripping the first transport article 11, the stroke 111 may be stopped at a position of the minimum range of motion. The height of the return article may be L1.

Figure 6:
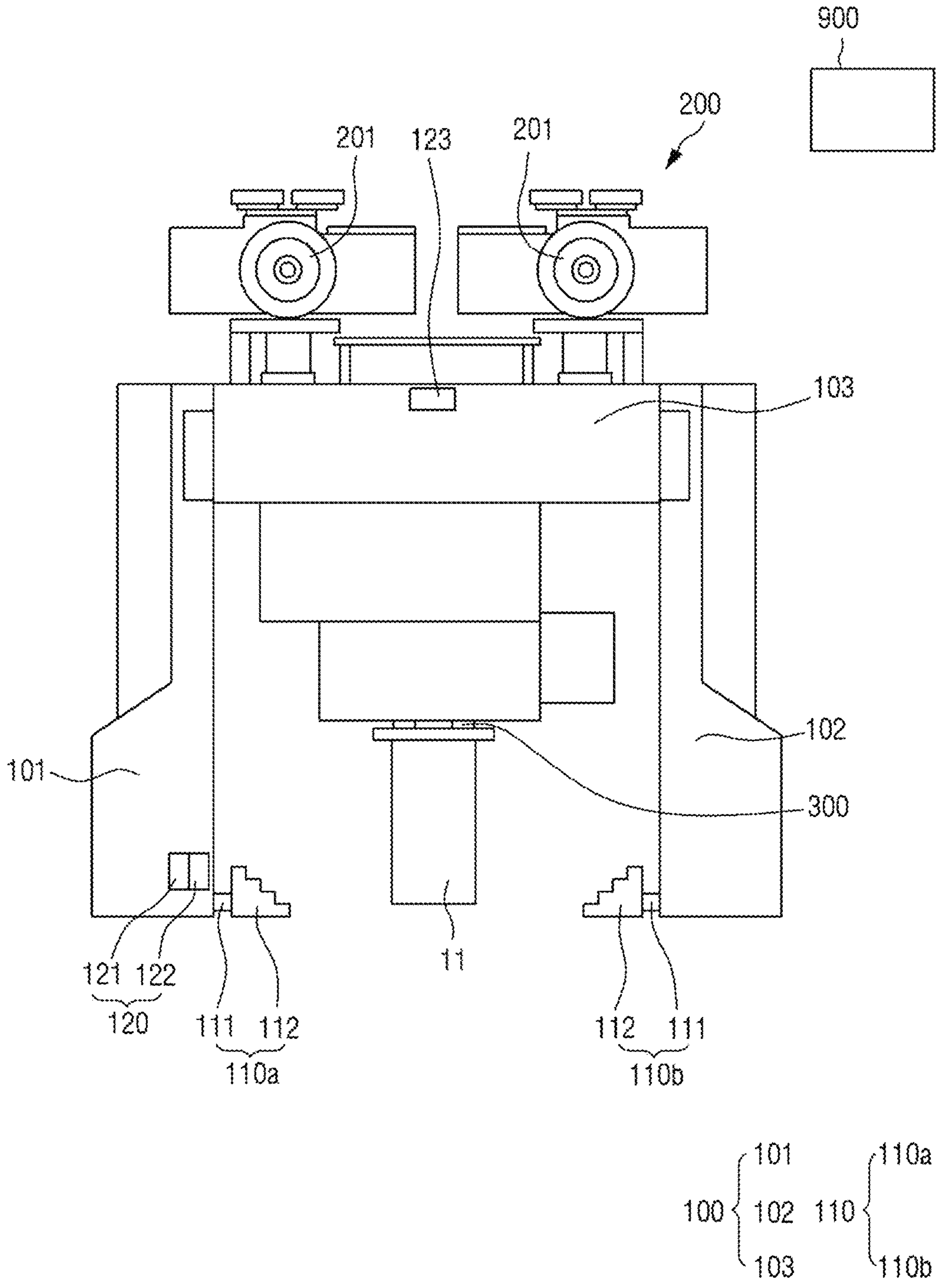
FIG. 6 is a cross-sectional view to illustrate an article transport device according to some embodiments of the present disclosure.

FIG. 6 is a cross-sectional view to illustrate an article transport device according to some embodiments of the present disclosure. For convenience of explanation, FIG. 6 is explained focusing on the differences from the points described in FIG. 1 and FIG. 5.

Referring to FIG. 6, the hoist unit 300 may grip the first transport article 11 and then lift the first transport article 11.

Figure 7:
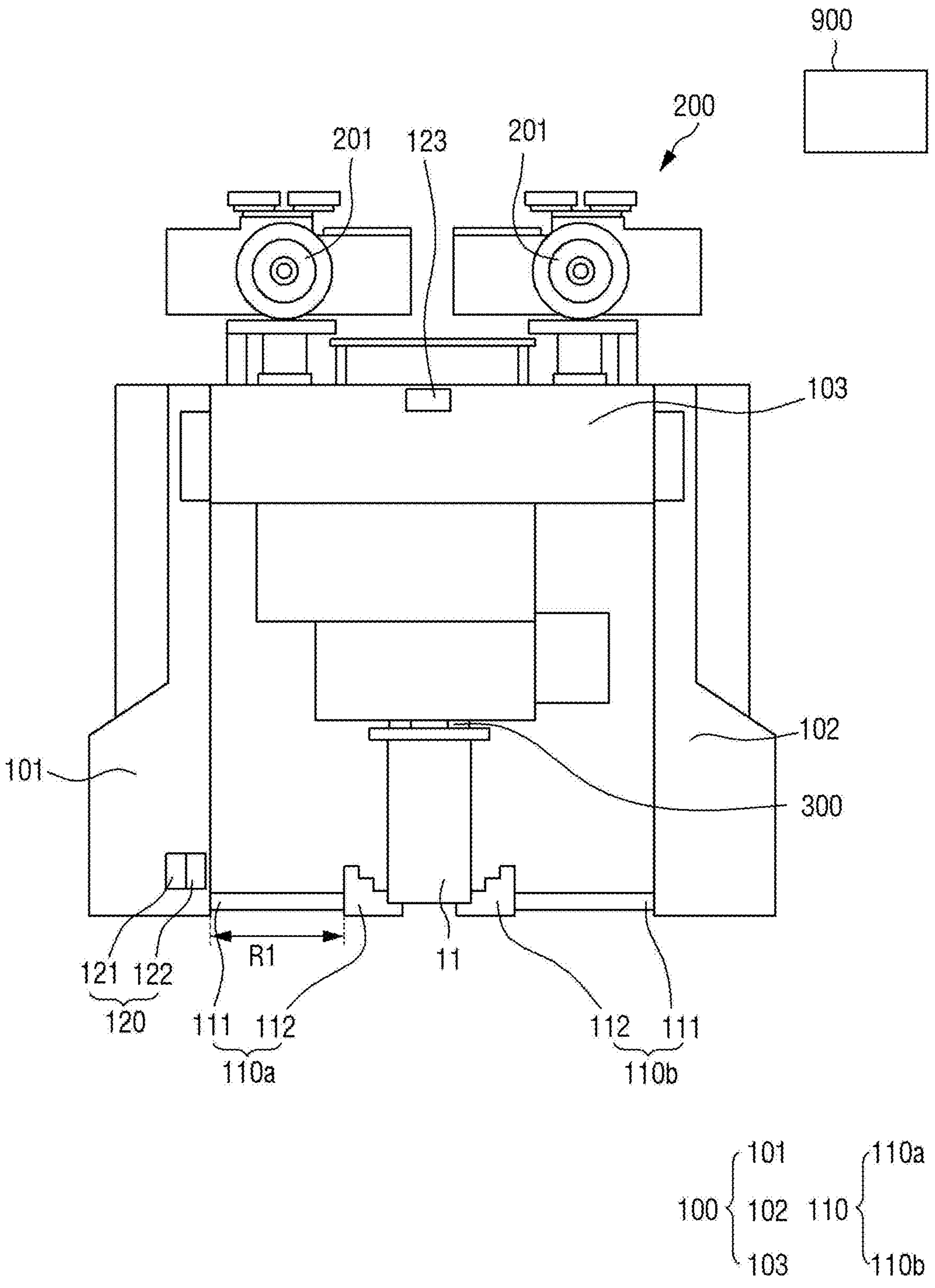
FIG. 7 is a cross-sectional view to illustrate an article transport device according to some embodiments of the present disclosure.

FIG. 7 is a cross-sectional view to illustrate an article transport device according to some embodiments of the present disclosure. For convenience of explanation, FIG. 7 focuses on differences from the points described in FIG. 1 and FIG. 6.

Referring to FIG. 7, when the hoist unit 300 lifts the first transport article 11, the stroke 111 may move toward the internal space B. In other words, the stroke 111 may move toward the first transport article 11. As the stroke 111 moves toward the internal space B, the contact portion 112 may contact the first transport article 11.

When the stroke 111 starts to move toward the internal space B, it may not stop until the contact portion 112 contacts the first transport article 11. When the contact portion 112 contacts the first transport article 11, the stroke 111 may stop.

Figure 8:
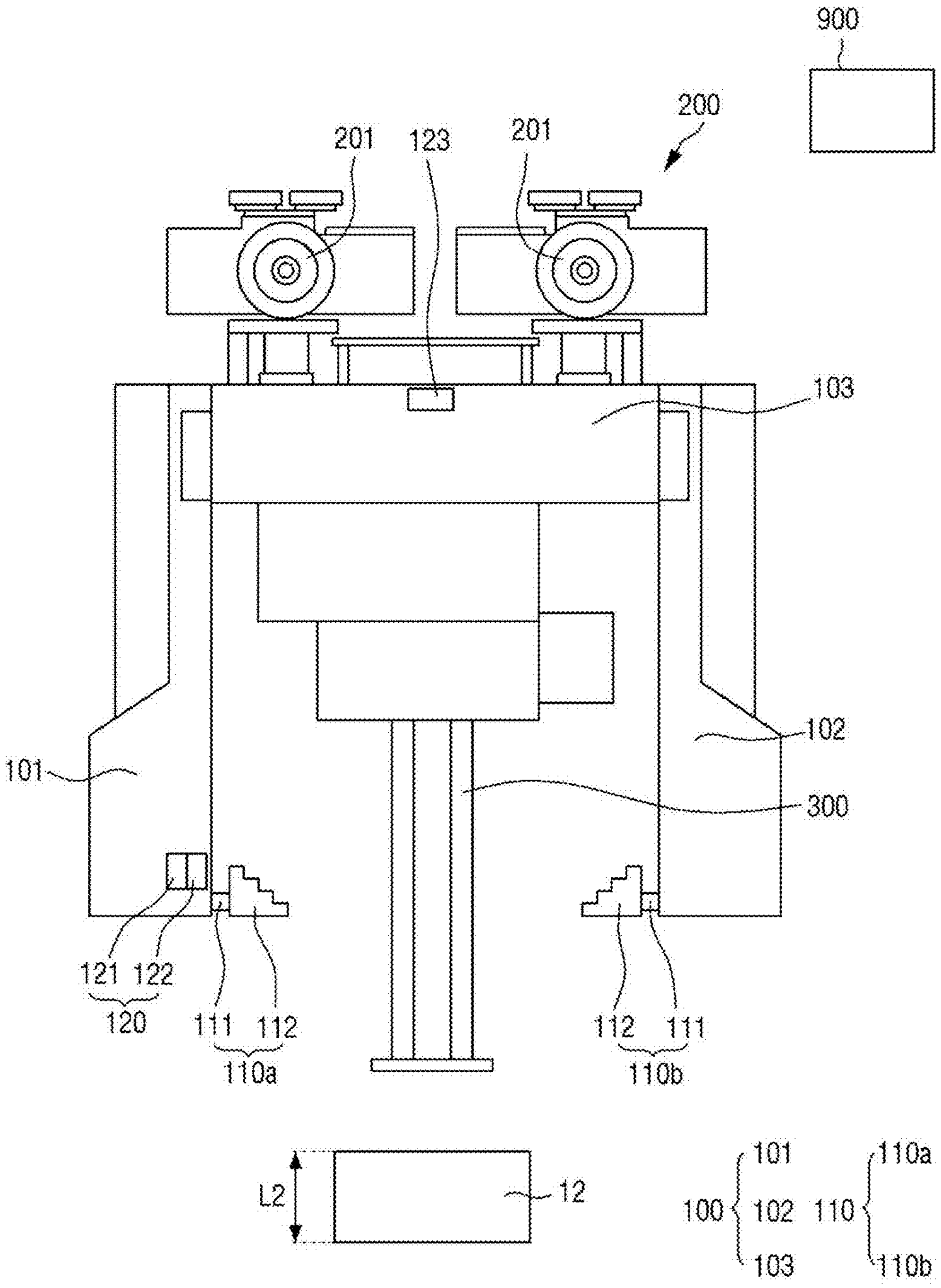
FIG. 8 is a cross-sectional view to illustrate an article transport device according to some embodiments of the present disclosure.

FIG. 8 is a cross-sectional view to illustrate an article transport device according to some embodiments of the present disclosure. For convenience of explanation, FIG. 8 is explained mainly based on differences from the points described in FIG. 5.

Referring to FIG. 8, a second transport article 12 may be disposed at a bottom of the article transport device. The hoist unit 300 may descend toward the second transport article 12 to grip the second transport article 12. Since it is before gripping the second transport article 12, the stroke 111 may be stopped at a position of the minimum range of motion. The height L2 of the second transport article 12 may be smaller than the height L1 of the first transport article 11 (see in FIG. 4).

Figure 9:
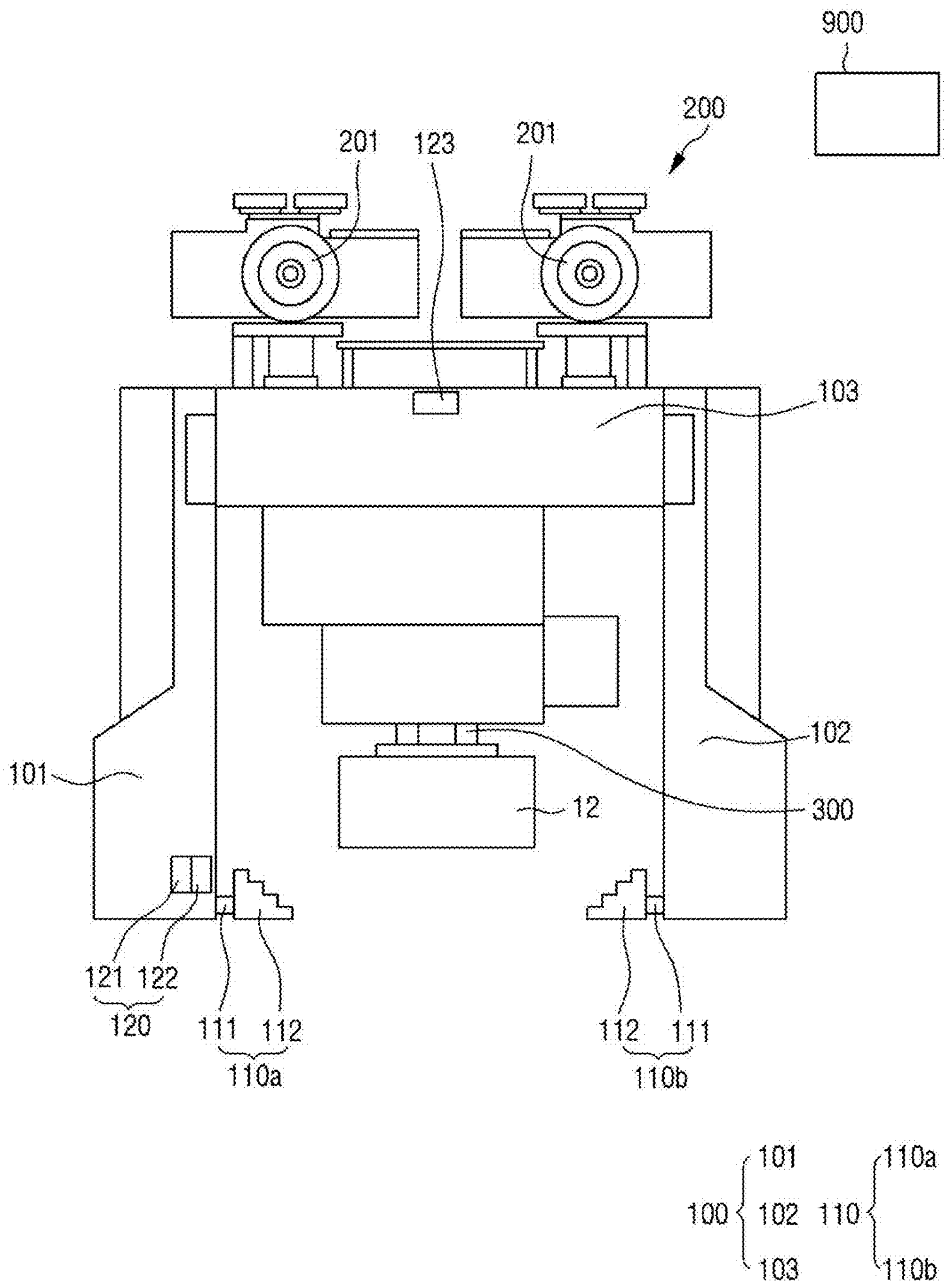
FIG. 9 is a cross-sectional view to illustrate an article transport device according to some embodiments of the present disclosure.

FIG. 9 is a cross-sectional view to illustrate an article transport device according to some embodiments of the present disclosure.

Referring to FIG. 9, the hoist unit 300 may grip the second transport article 12 and then lift after gripping the second transport article 12.

Figure 10:
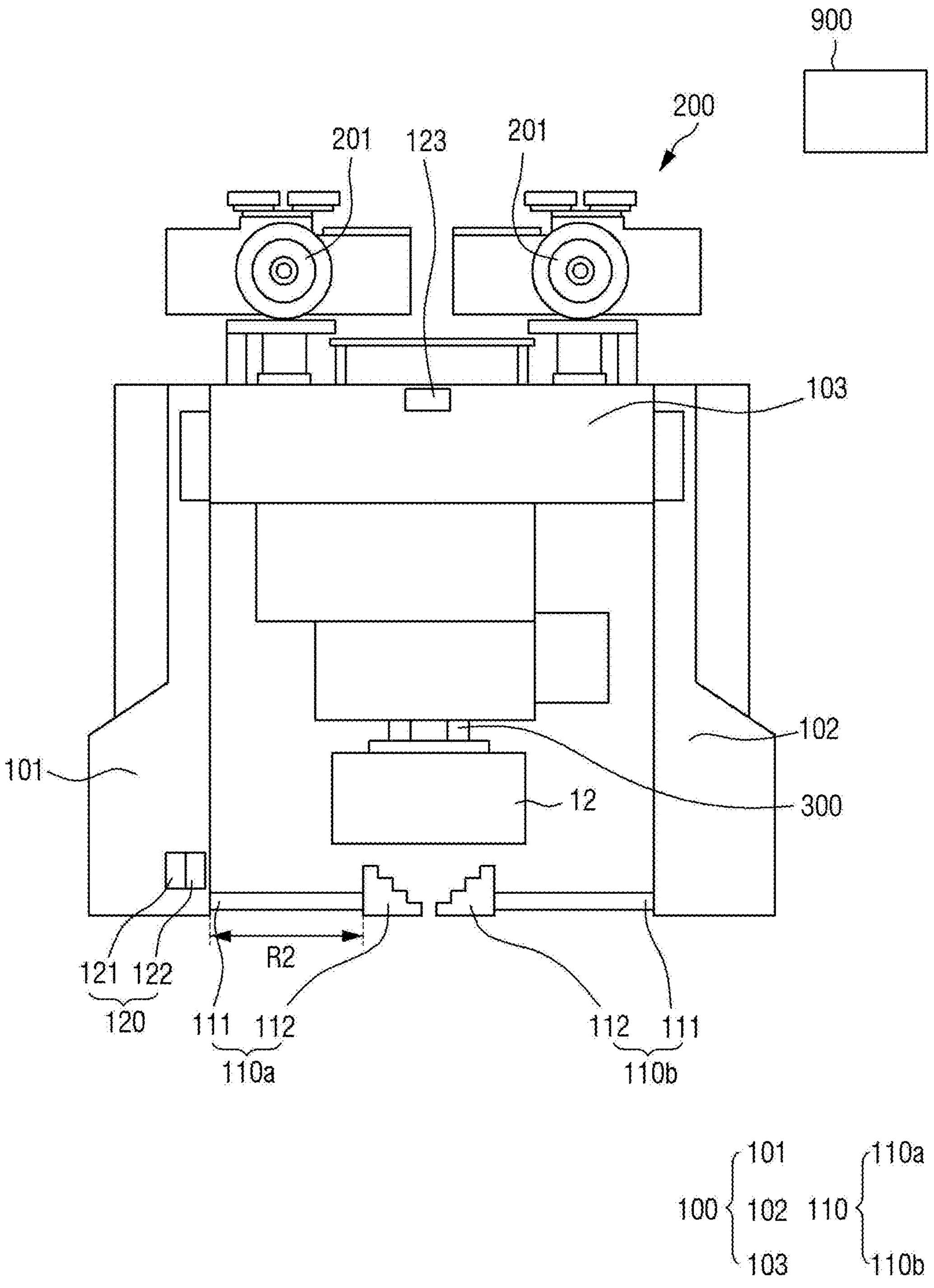
FIG. 10 is a cross-sectional view to illustrate an article transport device according to some embodiments of the present disclosure.

FIG. 10 is a cross-sectional view to illustrate an article transport device according to some embodiments of the present disclosure. For convenience of explanation, FIG. 10 will be described focusing on differences from the points described in FIG. 7.

Referring to FIG. 10, when the hoist unit 300 grips and lifts the second transport article 12, the stroke 111 may move toward the internal space B. In other words, the stroke 111 may move toward the second transport article 12.

Even if the stroke 111 moves toward the internal space B, if the height of the second transport article 12 (see L2 in FIG. 8) is small, it may not contact the contact portion 112. As the stroke 111 starts to move toward the internal space B, the stroke 111 may move to the position of the maximum movable range R2. Even if the stroke 111 moves to the position of the maximum movable range R2, it may not contact the second transport article 12. In this case, the second stroke sensor 122 may transmit a signal to the control portion 900 to stop the stroke 111 at the position of the maximum movable range R3. The stroke 111 may be stopped by the control portion 900 and may be positioned below the second transport article 12 without contacting the second transport article 12.

Figure 11:
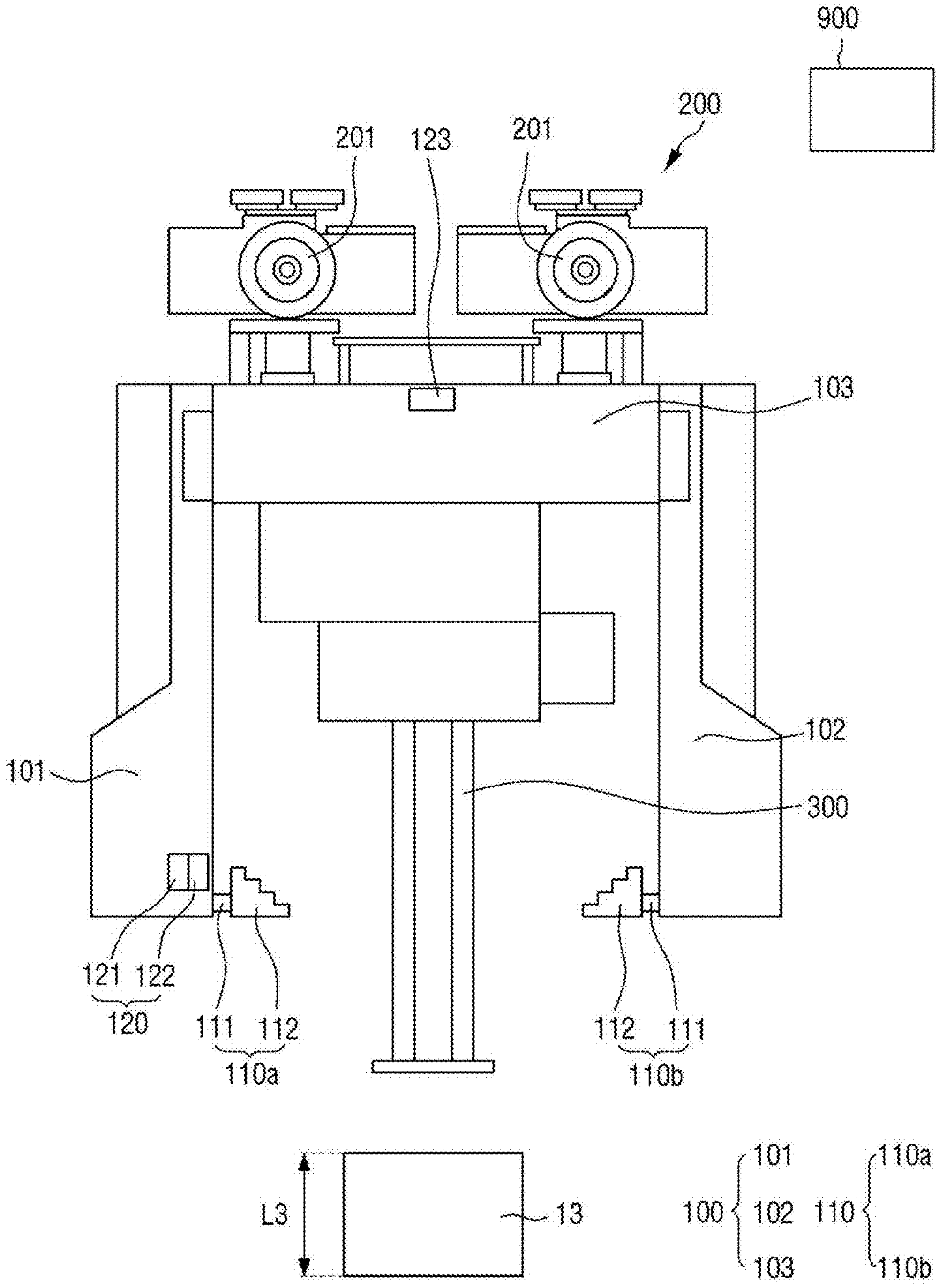
FIG. 11 is a cross-sectional view to illustrate an article transport device according to some embodiments of the present disclosure.

FIG. 11 is a cross-sectional view to illustrate an article transport device according to some embodiments of the present disclosure. For convenience of explanation, FIG. 11 will be explained focusing on the differences from the points described in FIG. 5.

Referring to FIG. 11, a third transport article 13 may be disposed at the bottom of the article transport device. The hoist unit 300 may descend toward the third transport article 13 to grip the third transport article 13. Since it is before gripping the third transport article 13, the stroke 111 may be stopped at a position of the minimum range of motion. The height L3 of the third transport article 13 may be smaller than the height (L1 of FIG. 4) of the first return material (see 11 in FIG. 4).

Figure 12:
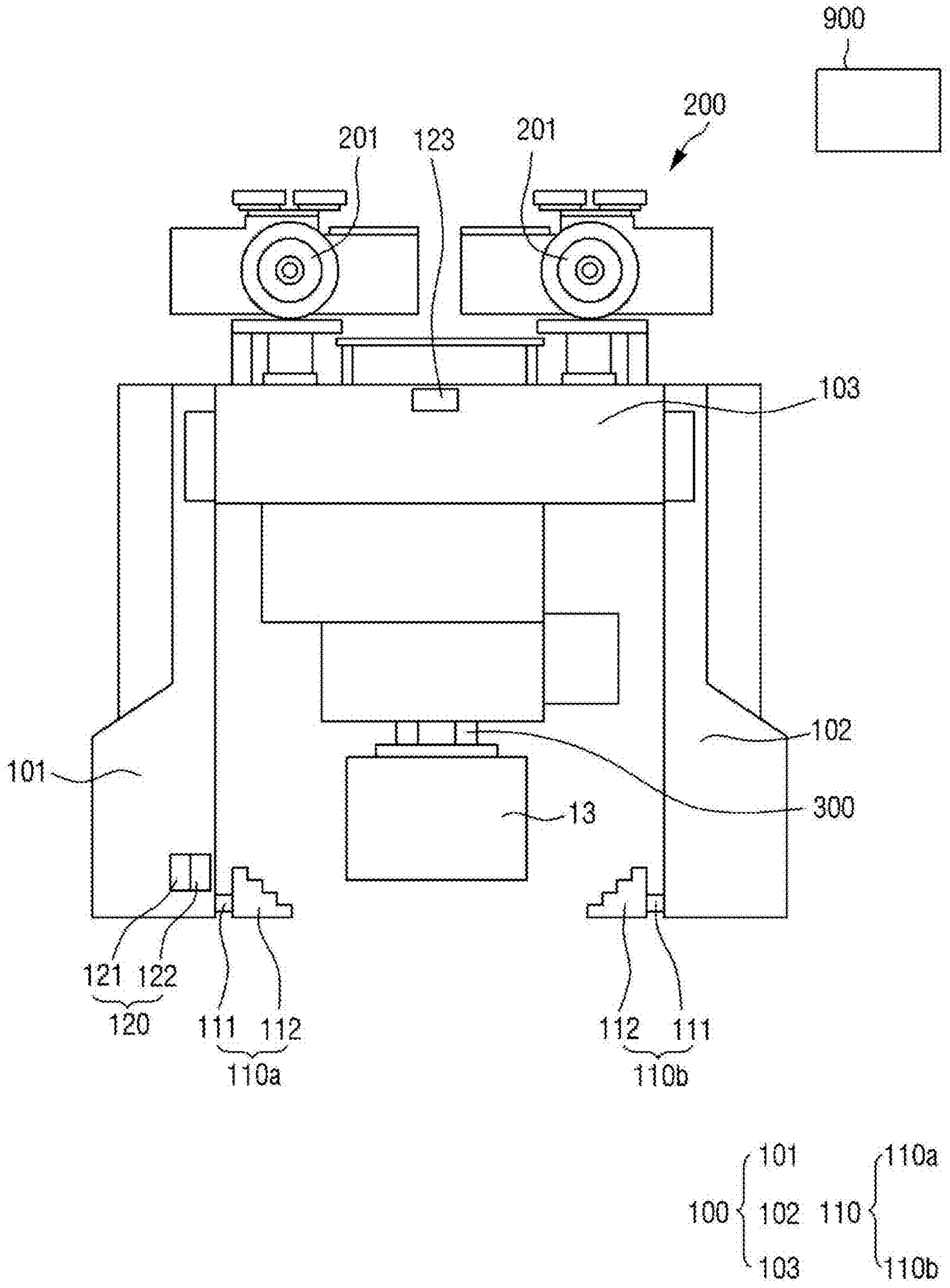
FIG. 12 is a cross-sectional view to illustrate an article transport device according to some embodiments of the present disclosure.

FIG. 12 is a cross-sectional view to illustrate an article transport device according to some embodiments of the present disclosure. Referring to FIG. 12, the hoist unit 300 may lift the second transport article 12 after lifting the third transport article 13.

Figure 13:
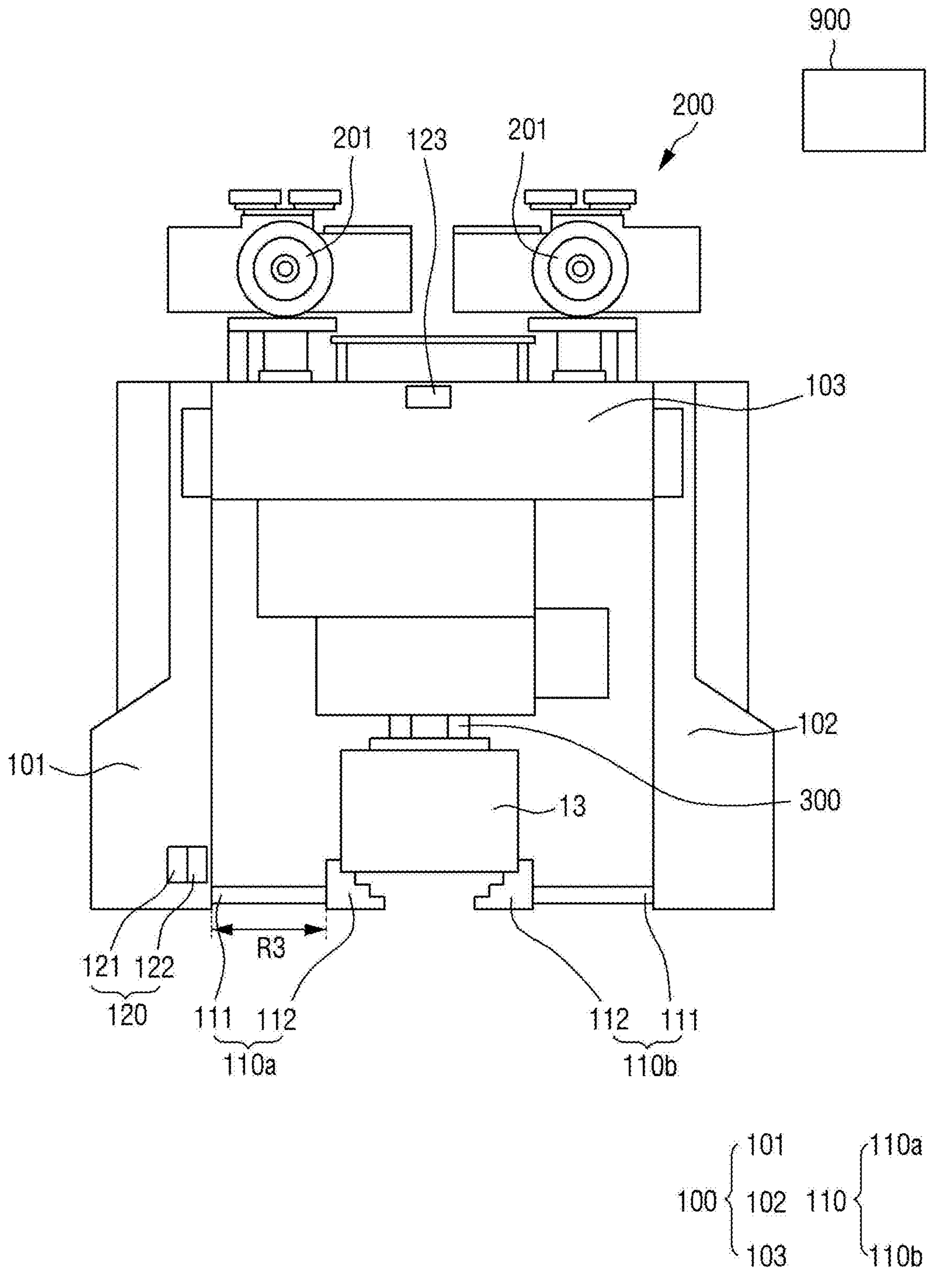
FIG. 13 is a cross-sectional view to illustrate an article transport device according to some embodiments of the present disclosure.

FIG. 13 is a cross-sectional view to illustrate an article transport device according to some embodiments of the present disclosure. For convenience of explanation, FIG. 13 will be explained focusing on differences from the points described in FIG. 7.

Referring to FIG. 13, when the hoist unit 300 grips and lifts the third transport article 13, the stroke 111 may move toward the internal space B. In other words, the stroke 111 may move toward the third transport article 13. The stroke 111 moves toward the internal space B, so that the contact portion 112 may contact the third transport article 13.

When the stroke 111 starts to move toward the inner space B, the contact portion 112 may not stop until the contact portion 112 contacts the transport article 13. When the contact portion 112 contacts the third transport article 13, the stroke 111 may stop. The length R3 by which the stroke 111 moves when the contact portion 112 contacts the third transport article 13 may be smaller than the length R1 by which the stroke 111 moves when the contact portion 112 contacts the first transport article (see 11 in FIG. 1).

In other words, both the first transport article (see 11 in FIG. 1) and the third transport article 13 of different sizes may contact the contact portion 112 by the contact portion 112 having a step shape. In this way, the contact portion 112 has a step shape, so it may effectively handle items of various sizes.

Figure 14:
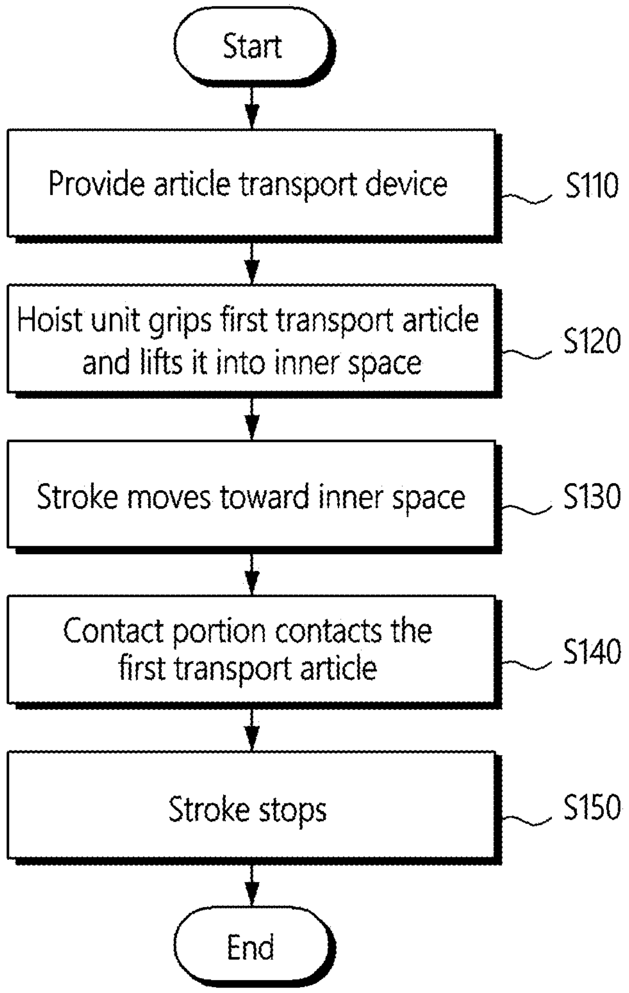
FIG. 14 is a flowchart to illustrate an article transport method according to some embodiments of the present disclosure.

FIG. 14 is a flowchart to illustrate an article transport method according to some embodiments of the present disclosure.

Referring to FIG. 14, an article transport device is provided (S110).

Specifically, the article transport device may include a housing (see 100 in FIG. 1), a driving unit (see 200 in FIG. 1), a hoist unit (see 300 in FIG. 1), and an anti-drop unit (see 110*a* and 110*b* in FIG. 1).

The housing 100 may include an internal space (see B in FIG. 1). The housing 100 may include a body (see 103 in FIG. 1), a first cover (see 101 in FIG. 1), and a second cover (see 102 in FIG. 1). The driving unit 200 may include a plurality of wheels (see 201 in FIG. 1). The anti-drop unit 110 may include a first anti-drop unit (see 110*a* in FIG. 1) and a second anti-drop unit (see 110*b* in FIG. 1). The anti-drop unit 110 may include a stroke (see 111 in FIG. 1) and a contact portion (see 112 in FIG. 1).

Subsequently, the hoist unit 300 grips the first transport article (see 11 in FIG. 5) and lifts it into the internal space B (S120).

Specifically, the hoist unit 300 may descend vertically to grip the first transport article 11. The hoist unit 300 may lift the first transport article 11 into the internal space B.

Then, the stroke 111 moves toward the internal space B (S130).

Specifically, the stroke 111 may move from a position of the minimum movable range to a position of the maximum movable range.

Next, the contact portion 112 contacts the first transport article 11 (S140).

Specifically, when the stroke 111 moves toward the internal space B, the contact portion 112 may contact the transport article.

Then, the stroke 111 stops (S150).

Specifically, when the contact portion 112 contacts the first transport article 11, the stroke 111 may stop.

In concluding the detailed description, those skilled in the art will appreciate that many variations and modifications may be made to the preferred embodiments without substantially departing from the principles of the present inventive concept. Therefore, the disclosed preferred embodiments of the invention are used in a generic and descriptive sense only and not for purposes of limitation.

What is claimed is:

1. An article transport device comprising:

a housing including an internal space;

a driving unit disposed on an upper portion of the housing and traveling along a driving rail installed on a ceiling;

a hoist unit disposed in the internal space and gripping a first transport article; and an anti-drop unit installed in the housing and preventing the transport article from falling, wherein the anti-drop unit includes a stroke configured to move toward the internal space, and a contact portion installed at one end of the stroke and contacting the first transport article, wherein the contact portion is disposed at a bottom-most end of the article transport device and has a step shape comprising more than two steps that descend in a direction toward a center of the internal space, and every step of the more than two steps of contact portion is configured to support the first transport article and prevent the first transport article from dropping out of the internal space.

2. The device of claim 1, wherein the hoist unit has gripped the first transport article in the internal space and the stroke moves toward the internal space such that the stroke stops when the contact portion contacts the first transport article.

3. The device of claim 2, wherein the contact portion does not stop until it contacts the first transport article when the stroke starts to move toward the internal space.

4. The device of claim 1, wherein the housing includes a body, a first cover installed on one surface of the body and protruding downward, and a second cover installed on the other surface of the body and protruding downward, and wherein the anti-drop unit includes a first anti-drop unit installed on the first cover, and a second anti-drop unit installed on the second cover.

5. The device of claim 1, wherein the hoist unit has gripped a second transport article in the interior space that is lower than the height of the first transport article, and wherein if the stroke moves to its maximum range of motion and the contact portion does not contact the second transport article, the stroke stops at a position in the maximum range of motion.

6. The device of claim 1, wherein a step shape of the contact portion that is chamfered and has curved edges in that surfaces of the contact portion that engage with the first transport article and on which the first transport article is supported are curved.

7. The device of claim 1, further comprising a first stroke sensor installed at a portion where the anti-drop unit and the housing are connected and detects whether the stroke has moved to a minimum movable range and transmits a signal;

a second stroke sensor installed at the area where the anti-drop unit and the housing are connected, and transmitting a signal in response to detecting whether the stroke has moved to a maximum operating range; and a control portion that detects signals from the first stroke sensor and the second stroke sensor.

8. The device of claim 7, wherein the control portion detects signals from the first stroke sensor and the second stroke sensor and stops the stroke.

9. The device of claim 1, further comprising a load detection sensor installed in the internal space and detecting whether the first transport article is located in the internal space.

10. The device of claim 9, wherein the first transport article further includes a flange portion configured to be gripped by the hoist unit.

11. The device of claim 10, wherein the load detection sensor detects the flange portion of the transport article.

12. An article transport device comprising:

a housing including an internal space, a driving unit disposed on an upper portion of the housing and traveling along a driving rail installed on a ceiling, a hoist unit disposed in the internal space and gripping a first transported article, and an anti-drop unit disposed in the housing and preventing the first transport article from falling, wherein the anti-drop unit includes a stroke configured to move toward the internal space and a contact portion installed at one end of the stroke and contacting the first transport article, wherein the contact portion is disposed at a bottom-most end of the article transport device and has a stair-shaped shape comprising more than two steps that descend in a direction toward a center of the internal space, and every step of the more than two steps of contact portion is configured to support the first transport article and prevent the first transport article from dropping out of the internal space, wherein the hoist unit grips the first transport article and lifts the first transport article into the internal space, wherein the stroke stops when the contact portion contacts the first transport article as the stroke moves toward the internal space.

13. The device of claim 12, wherein the hoist unit grips the second transport article at a height lower than the first transport article and lifts the second transport article into the interior space, wherein the stroke moves toward the interior space to a maximum range of motion, and if the contact portion does not contact the second transport article, the stroke stops at a position in the maximum range of motion.

14. The device of claim 12, wherein the step shape of the contact portion is chamfered and has curved edges.

15. The device of claim 12, wherein the article transport device further includes a first stroke sensor installed at a portion where the anti-drop unit and the housing are connected and detects whether the stroke has moved to the minimum movable range and transmits a signal, a second stroke sensor installed at a portion where the anti-drop unit and the housing are connected and detects whether the stroke has moved to the maximum movable range and transmits a signal, and a control portion that detects signals from the first stroke sensor and the second stroke sensor.

16. The device of claim 12, wherein the hoist unit has the first transport article gripped in the interior space and the stroke moves toward the interior space, the stroke stopping when the contact portion contacts the first transport article.

17. The device of claim 16, wherein the contact portion does not stop until it contacts the first transport article when the stroke starts to move toward the internal space.

18. An article transport device comprising:

a housing including an internal space;

a driving unit disposed on an upper portion of the housing and traveling along a driving rail installed on a ceiling;

a hoist unit disposed in the internal space and gripping a first transport article;

an anti-drop unit disposed in the housing and including a stroke configured to prevent the first transport article from falling, and moving towards the interior space, and a contact portion installed at one end of the stroke and in contact with the first transport article;

a first stroke sensor installed at a portion where the anti-drop unit and the housing are connected and detects whether the stroke has moved to a minimum range of motion and transmits a signal;

a second stroke sensor installed at a portion where the anti-drop unit and the housing are connected and detects whether the stroke has moved to a maximum range of motion and transmits a signal; and a control portion that detects signals from the first stroke sensor and the second stroke sensor and stops the stroke, and wherein the contact portion is disposed at a bottom-most end of the article transport device and has a stair-shaped shape comprising more than two steps that descend in a direction toward a center of the internal space, and every step of the more than two steps of contact portion is configured to support the first transport article and prevent the first transport article from dropping out of the internal space.

* * * * *